May 27, 1969

JAMES E. WEBB
ADMINISTRATOR OF THE NATIONAL AERONAUTICS
AND SPACE ADMINISTRATION
RANGING SYSTEM 3,447,155

Filed Nov. 9, 1967

INVENTOR.
TAGE O. ANDERSON
BY D E Leslie
A Ins Coy
ATTORNEY

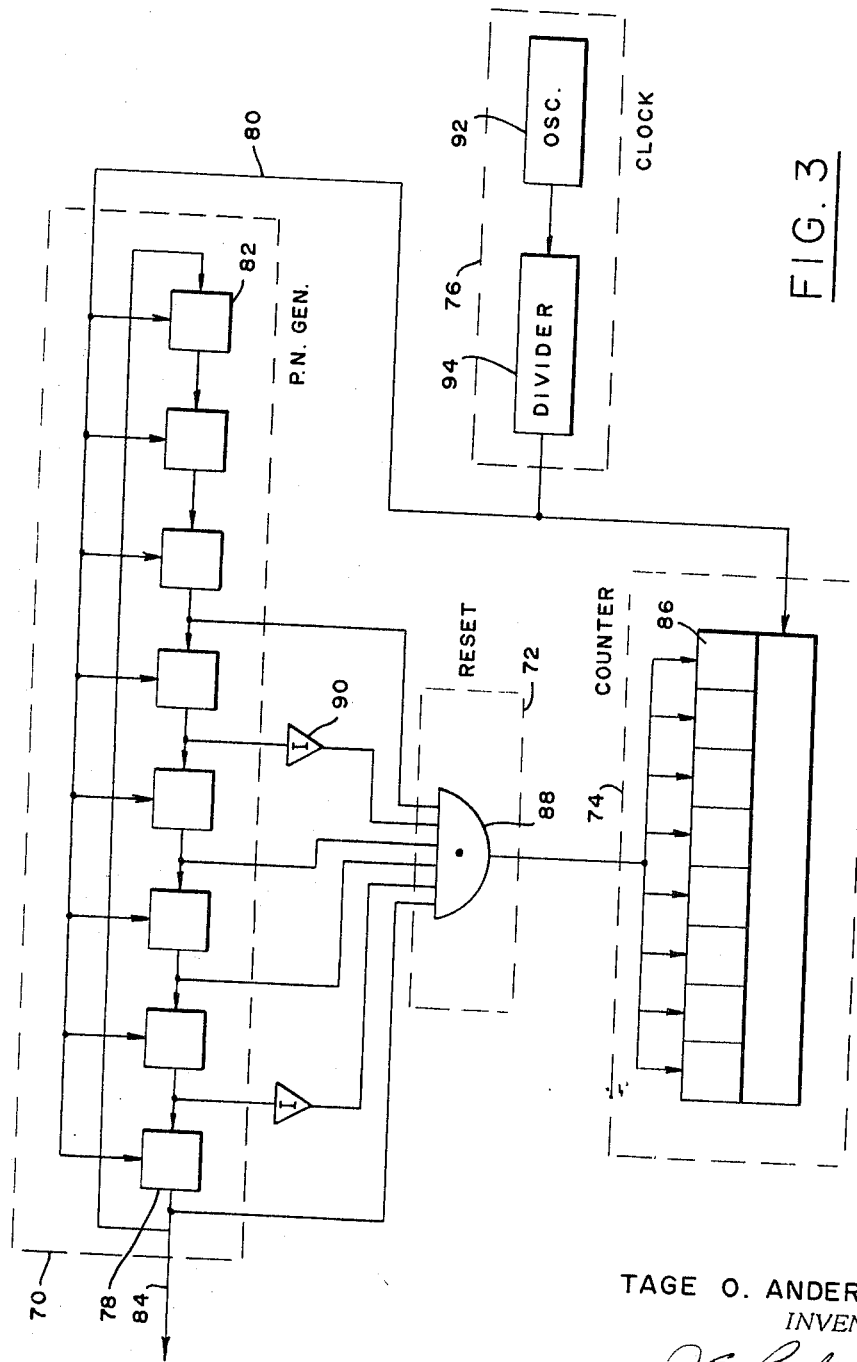

United States Patent Office 3,447,155
Patented May 27, 1969

3,447,155
RANGING SYSTEM
James E. Webb, Administrator of the National Aeronautics and Space Administration with respect to an invention of Tage O. Anderson, Arcadia, Calif.
Filed Nov. 9, 1967, Ser. No. 681,693
Int. Cl. G01s 9/06, 9/23, 9/24
U.S. Cl. 343—13       11 Claims

ABSTRACT OF THE DISCLOSURE

An improved system for determining the range to a distant object such as an extra-terrestrial space probe by transmitting a pseudorandom code and measuring the time between sending the code and receiving it back from the object, the improvement comprising a counter connected to the transmitter code generator for converting the pseudorandom code to a number at every instant, a second counter connected to the pseudorandom code receiver for converting the code received into a second number at every instant, and a circuit for comparing the numbers counted by the first and second counters to provide a range indication.

Origin of invention

The invention described herein was made in the performance of work under a NASA contract and is subject to the provisions of Section 305 of the National Aeronautics and Space Act of 1958, Public Law 85–568 (72 Stat. 435; 42 USC 2457).

Background of the invention

This invention relates to apparatus and methods for measuring distance by electromagnetic radiation.

The determination of the distance or speed of a very distant object such as an extraterrestrial space probe is difficult largely because the received signals are very weak. Often the space probe merely reflects the incident signal or retransmits signals of relatively small power, so that it is difficult to distinguish the received signals from noise. To overcome this difficulty, the transmitted signals are often encoded with a pseudorandom code so that the received signals can be detected by correlation processes which enable the detection of signals contained in very noisy backgrounds. The detection of the pseudorandom codes is made by multiplying the received code by a locally generated code whose phase is shifted for maximum correlation between the two codes. When the phase shift of the locally generated, phase-shifted code is by a time period required for a roundtrip passage of the transmitted radiation from the transmitter, to the space probe, and back to the transmitter, the received code and locally generated code will be in phase. When they are in phase, their product is a maximum correlation signal such as a DC signal, and when such a signal is detected, gross phase shifting is stopped. Achieving such phase coincidence is often referred to as "acquiring" the received signal.

The measurement of the phase shift between the transmitted code and locally generated code is difficult because of the random nature of the codes. Accordingly, in prior systems the phase difference was generally determined by measuring the number of steps by which the local code had to be shifted for acquisition of the received code. In practice, this was found to be unreliable because errors were easily made in measuring the amount by which the local code had been shifted. Such shifts were often accomplished manually, the DC reading being noted after each shift, and phase shifting sometimes being made forward and backward to check whether the code had actually been acquired. After acquisition, gross shifts in phase were stopped, and only small or vernier phase shifts were made, the vernier shifts usually being made by automatic equipment. The exact range to an object was determined by using the range indicated by the amount of shifting required for acquisition plus or minus any range differece indicated by the vernier adjustments. If any error were made in determining phase shift for acquisition, this error would be repeated for every range measurement, inasmuch as all measurements were based on the initial measurement.

It is an important object of this invention to provide a ranging system and method utilizing pseudorandom codes, wherein measurement of the phase difference between the transmitted and received codes is facilitated, thereby enabling frequent measurements of the gross phase difference and assuring high accuracy.

Another object is to provide a pseudorandom code ranging system wherein comparisons of the phase of the transmitted and received codes are made at a greater frequency than is possible in systems available heretofore.

Summary of the invention

The present invention provides a ranging system including a counter connected to the pseudorandom number (PN) generator of the transmitter to convert the code at every instant into a number. A similar counter is connected to a phase shifted code which, after sufficient phase shifting to enable acquisition, is in phase with the received code from the space probe or other object. An arithmetic unit connected to the counters, indicates the difference between their counts. The difference in count between the two counters indicates the phase difference, which indicates range to the object. An arithmetic unit which readily indicates the difference between the counts registered on the two counters is easily constructed because the count on each counter is in an easily processed form, such as a regular binary-digit number. An arithmetic unit cound not be readily constructed for directly indicating the difference between the transmitted code and the phase-shifted code because random numbers are difficult to compare. The difference between the two counters is readily determined each time the range is to be measured, and therefore any error in a previous determination is not repeated.

The frequency of the pulses in the PN code may be on the order of one megacycle. Acquisition of the PN code therefore would indicate range to within 300 meters. For more accurate ranging, apparatus is provided to indicate at what instant the received code and receiver generated code are exactly in phase or a predetermined amount out of phase, the range at that instant then being known with high precision. Such apparatus may be in the form of circuitry for maintaining the receiver generated code and received code in a particular phase relationship, such as exactly one-quarter of a pulse width out of phase. A comparison of the phase of the clock pulses advancing the transmitter PN code with the phase of the pulses advancing the receiver generated code is made, and a pulse is delivered when they are exactly in phase coincidence. When such a pulse is received, the range to the object is known with high accuracy.

In one embodiment of the invention, the conversion of each PN code to a counter is made by providing an independent counter which is advanced by one count each time the PN generator is advanced to deliver a new pulse of the PN code. The PN generator may be in the form of a shift register, with the output taken from one cell of the register, and with the outputs of every cell advancing to the next succeeding cell at each clock pulse input. The counter is connected to the same clock, and advances by one count for each clock input. To synchronize the PN generator and the counter, a reset circuit is connected to the counter to set it to zero whenever the PN generator is in a particular state indicating the beginning of a new repetition of the PN code.

A more complete understanding of the invention can be had by considering the following detailed description and claims when considered in conjunction with the accompanying drawings.

Brief description of the drawings

FIGURE 3 is a simplified schematic diagram of one embodiment of a portion of the circuit of FIGURE 2, showing the PN generator and counter and their interconnections.

Description of the preferred embodiments

Figure 1:
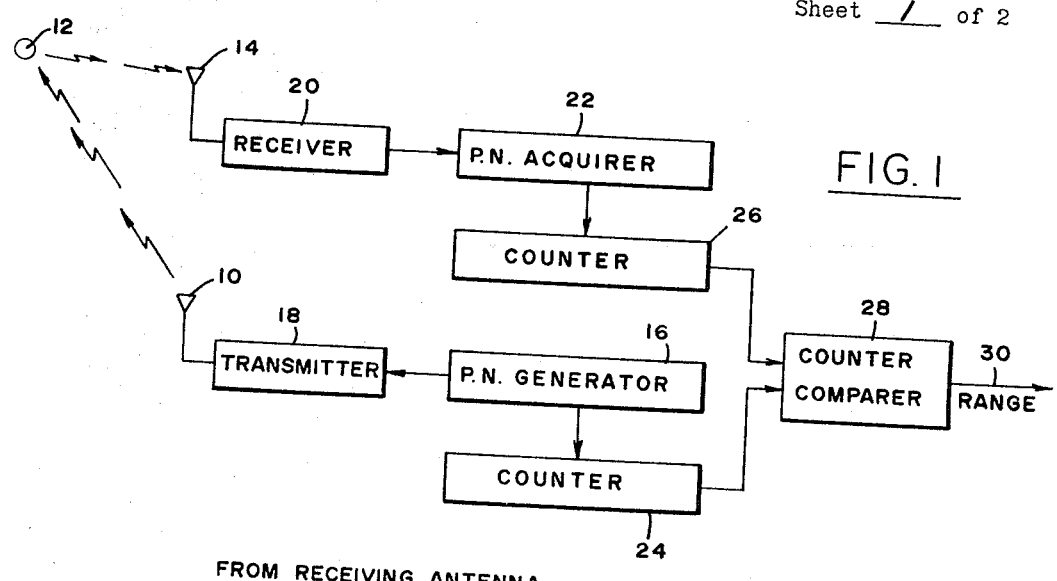
FIGURE 1 is a highly simplified diagram of a ranging system constructed in accordance with the invention.

FIGURE 1 is a simplified schematic diagram of an embodiment of the invention comprising a transmitter antenna 10 for transmitting electromagentic radiation to an object 12, such as a space probe, and a receiver antenna 14 for receiving the electromagnetic radiation which may be either reflected off of the object 12 or retransmitted therefrom. By measuring the time between the transmission and reception of the radiation, the distance or range of the object 12 is determined.

The transmitter portion of the system comprises a PN generator 16 which generates a pseudorandom code. Such a code, when multiplied by itself, will provide a DC or other maximum correlation signal when the two factor codes are in phase. For example, the code may consist of a random series of binary digits such as $+1$ and $-1$ generated at a frequency or rate of one megacycle, and which repeats only at long intervals. The intervals between repetitions are generally chosen to be at least equal to the longest expected time of transit of the radiation on a round trip from the transmitter to the object, or the shortest interval over which doubt as to range may exist. For example, if the range to the object is known to within 1,000 miles, a PN code generated at a rate of one million characters per second having a length of 6,000 characters between repetitions can be utilized, inasmuch as the radiation then will travel more than 2,000 miles before the code begins to repeat. The measurement of the approximate distance to the object, such as to the nearest 1,000 miles, can be determined by a number of methods, including the use of another pseudorandom code of much slower pulse rate.

In the ranging system shown in FIGURE 1, the PN code generator 16 delivers pulses to a transmitter 18 which utilizes the code pulses to modulate a carrier wave at a higher frequency such as 2300 mHz. to facilitate radiation through space to the object 12. The radiation received by the receiver antenna 14 is first processed through a receiver 20 which demodulates the radiation, as by heterodyning it, to derive the PN code thereof. The code is delivered to a circuit 22 for acquisition of the code. Acquisition by the circuit 22 is accomplished by comparing the received code with a locally generated code which is identical to the transmitted code but delayed by various amounts. The comparison is made by multiplying the received and locally generated codes or by other means, and the variation in delay is accomplished manually or automatically. When the delayed locally generated code is in phase with the received code, acquisition has been accomplished. The rest of the circuit is utilized to compare the transmitted code, delivered by the generator 16, with the acquired code registered in the acquiring circiut 22 to determine their phase difference.

The phase difference between the codes in the PN generator 16 and the acquiring circuit 22 is determined by comparing the counts of counters 24 and 26. Each counter registers a count which indicates at every instant, how far the code has progressed from a particular point on the code which may be considered its beginning. For example, when the code reaches a given point along the code pattern which is designated the beginning, the counter is reset to zero, and it then advances by one count in unison with the pulse rate of the code, such as every microsecond for a PN code rate of one megacycle. When the entire code has been delivered and begins to repeat again, the count in the counter is reduced to zero and counting begins again. Both counters 24 and 26 are reset to zero at the beginning of the same pattern of repetition. The counts in the two counters 24 and 26 are delivered to a counter comparer 28 which provides an output at 30 equal to the difference in counts. The difference between the counts registered in the two counters indicates range. For example, for one megacycle PN pulse rate in a PN code 6,000 microseconds long, a count of 3,000 indicates a range of $4.5 \times 10^5$ meters plus an integer times $9 \times 10^5$ meters (the roundtrip distance during 6,000 microseconds).

Figure 2:
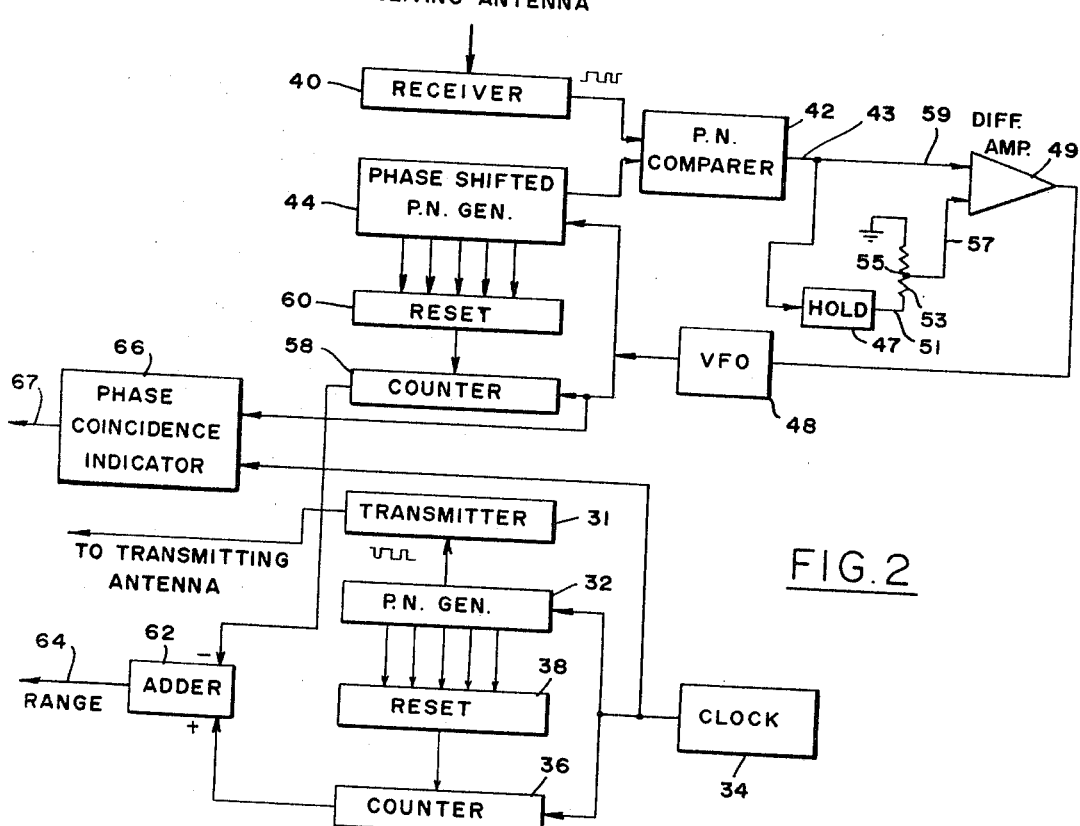
FIGURE 2 is a more detailed description of the ranging system of FIGURE 1.

FIGURE 2 illustrates the system of FIGURE 1 in greater detail. The portion of the circuit connected to the transmitter 31 comprises a PN generator 32 whose output is delivered to a modulator in the transmitter 31 for broadcast by an antenna. The code to be transmitted is registered in the PN generator 32 as a series of binary digits, succeeding binary digits being delivered to the transmitter at every clock pulse received from a clock 34. For a pulse rate of one megacycle, for example, the clock 34 delivers pulses with a repetition rate of one megacycle. The counter 36 may be a binary counter which advances by one count at every clock pulse it receives from the clock 34. Thus, the PN generator 32 and counter 36 advance in unison.

In order to assure that the generator 32 and counter 36 are synchronized, so that each count in the counter corresponds to a particular point along the PN code, a reset circuit 38 is provided. The reset circuit 38 monitors the PN generator 32 and delivers a pulse to the counter 36 which resets it to an initial count such as zero at some designated point along the code pattern which may be considered as the beginning of the PN code. After one synchronization, therefore, each count on the counter 36 indicates a particular point along the PN code delivered by the generator 32 to the transmitter.

The receiver portion of the circuit comprises a receiver 40 which demodulates the received radiation and delivers any PN code component to a PN comparor circuit 42. For example, the receiver 40 may heterodyne the received carrier wave so as to obtain its one megacycle component, and after suitable additional processing, including passage through band pass filters, this output, which contains the PN code, is delivered to the PN comparor circuit 42. A locally generated PN code is provided by a circuit shown at 44 and designated as a phase shifted PN generator. The code generated by the circuit 44 is a PN code identical to the PN code generated by the PN generator 32, except that it may be out of phase with the code transmitted by PN generator 32 to the transmitter.

The output of the phase shifted PN generator 44, which may be referred to as the receiver generated code, is delivered to the PN comparor circuit 42 which compares the codes received from the receiver 40 and from the generator 44. Such comparison may be made by multiplying the signals received from the two circuits. The output of the comparor circuit 42 will generally be a high frequency signal having a major component at the repetition rate of the code, such as one megacycle for a PN code which changes at one megacycle. However, when the code received from the receiver 40 and the code received from the generator 44 are in phase, a distinct DC component will be obtained by multiplying them. This DC component is delivered over an output 43 of the comparor.

The DC voltage at 43 rises from zero before acquisition, to a maximum when the received code and reeciver generated code are exactly in phase, and decreases as the codes become more out of phase.

If two separate PN generators are used for the PN generator circuits 32 and 44, their phase difference may be varied by advancing the receiver PN generator 44 at a different rate until the received PN code is acquired. In the circuit of FIGURE 2, this is accomplished by providing a variable frequency pulse generator or variable frequency oscillator (VFO) 48 which delivers pulses at a rate normally slightly greater than that of the clock 34, but whose rate can be varied so that it is slightly less than that of the clock 34. Pulses from the VFO 48 are delivered to the phase shifted PN generator 44 to advance it.

A counter 58 is provided which maintains a count indicating the position along the PN code which is being delivered by the receiver phase shifted PN generator 44. Synchronization of the counter 58 with the PN generator 44 is made in the same way as the counter 36 and transmitter generator 32 are synchronized. Pulses which advance both the PN code of the generator 44 and the count of the counter 58 are received from the VFO 48. Additional, reset of the counter 58 is accomplished by a circuit 60 identical to the reset circuit 38 of the transmitter circuit.

To determine the range of the object such as a spacecraft, the outputs of the counters 36 and 58 are delivered to an adder circuit 62. The adder circuit 62 determines the difference between the two counts, and delivers signals indicating this difference over its output 64. The difference indicates the range to the object, as has been explained above.

The accuracy with which the distance to an object can be determined, merely by comparing the counts on the counters 36 and 58 is limited by the repetition rate of the PN generators 32 and 44. For example, during the period of a one microsecond long pulse, an electromagnetic wave travels 300 meters. Accordingly, acquisition provides an indication of range with a possible error of plus or minus 150 meters. A vernier measurement of range could be obtained by measuring the DC voltage output from the PN comparor 42 and noting when the DC voltage is just past its maximum value as the range to the object varied. The PN code generated by the generator 44 and the received PN code would then be exactly in phase and the range would be known to greater accuracy. However, this method is inconvenient and inaccurate.

In order to provide range indications of high accuracy, the circuit of FIGURE 2 is provided with means for maintaining an exact phase relationship between the output of the phase shifted PN generator 44 and the phase of the received code from receiver 40. Then when the clock outputs of the clock 34 and VFO 48 coincide exactly, the range indicated by the adder 62 is the precise range (assuming that the range indicated takes into account the constant phase relationship maintained between the received code and the output of PN generator 44). If desired, the precise range can be determined at any instant, even when the outputs of clock 34 and variable generator 48 do not coincide, by measuring their phase difference.

In the circuit of FIGURE 2, a precise phase relationship is maintained between the output of receiver 40 and PN generator 44 by a hold circuit 47, differential amplifier 49, and the VFO 48. The hold circuit 47 retains the highest DC voltage input received from PN comparor 42, and continuously delivers this voltage on its output 51. The output at 51 is connected to a resistor 53, and thence to ground. A terminal 55 of the resistor provides a predetermined proportion of the voltage at 51, and this proportional voltage is delivered to one input 57 of the differential amplifier 49. The other input 59 of the differential amplifier 49 is received directly from the PN comparor 42. The difference between the inputs at 57 and 59 to the amplifier 49 is moderately amplified and delivered to the VFO 48. When this difference is positive, that is, when the voltage at input 57 is greater than that at 59, then the VFO 48 reduces its pulse rate to slightly less than that of the clock 34.

To aid in understanding the function of the hold circuit 47 and differential amplifier 49, an example may be considered wherein it is desired to maintain a phase difference of exactly one-quarter of a pulse length between the receiver generated code from receiver 40 and the code from generator 44, and with the receiver generated code leading. The DC voltage output from PN comparor 42 at such a phase difference is one-half of the maximum which occurs at complete phase coincidence. When the acquisition of the received code begins, the DC voltage from comparor 42 rises from zero to a maximum and then decreases. The maximum DC voltage represents the condition of zero phase difference between the received and locally generated codes. This maximum voltage is retained by the hold circuit 47 and is constantly delivered at its output 51. The reason why the DC voltage rises to its maximum and then falls is that the VFO 48 advances faster than the received code.

The terminal 55 of the resistor 53 is placed to receive exactly one-half of the output at 51. When the DC output of the comparor 42, which is delivered to input 59 of the differential amplifier 49, decreases to one-half its maximum, then it is equal to the input 57 of the differential amplifier. Any further decrease in voltage at 59 results in the amplifier 49 delivering a positive voltage to the VFO 48, causing it to deliver pulses at a slower rate. The slower rate results in the code delivered by PN generator 44 becoming more in phase with the received code. This results in an increased DC output from comparor 42, a termination of the positive output from comparor 42, a termination of the positive output from differential amplifier 49, and an increase of the pulse rate from generator 48 (to a rate slightly faster than the output of clock 34). The phase relationship between the received and locally generated codes will therefore remain constant at a quarter of a pulse length difference, with the locally generated code from generator 44 lagging.

With the received and receiver generated codes in a precise phase relationship, the exact range to the object will appear at output 64 of the adder when the pulses from clock 34 and generator 48 coincide exactly. To determine this instant, a phase coincident indicator 66 is provided. The time at which pulses are delivered at 67 from the phase coincidence indicator 66 can be recorded, and the speed of the spacecraft or other object thereby determined. For example, for pulses at 67 occurring at intervals of one-tenth second, a code rate of 1 megacycle, a speed of 1,500 meters per second of the spacecraft is indicated. The code rate can be chosen so that pulses will appear at 67 at a sufficiently rapid rate for the expected speed of the spacecraft.

For the case of a spacecraft which is moving slowly and a relatively slow code rate, pulses at 67 will occur at relatively long intervals. The precise range to the spacecraft can be determined by utilizing a phase indicator 66 which also indicates the exact phase relationship between the clock pulses from clock 34 and VFO 48. The range is determined by adding or subtracting a vernier range to the gross range indicated by the adder circuit at its output 34. For example if the clock 34 and generator 48 are out of phase by one-half of a pulse length, and the pulses are of one microsecond duration, during which the radiation travels 300 meters or 150 meters in a round trip, then the gross range must be changed by 75 meters. Whether it must be increased or decreased depends upon which clock pulse generator, 48 or 34, is leading.

FIGURE 3 is a schematic diagram of a pulse generator 70, reset circuit 72, counter 74, and clock 76 combination corresponding to the PN generator 32, reset circuit 38, counter 36, and clock 34 of FIGURE 2. The circuits shown in FIGURE 3 are highly simplified to facilitate their description. The PN generator 70 is a circulating shift register with many individual cells such as cell 78, each cell holding a binary digit. Upon the receipt of each clock pulse over line 80 from clock 76, each memory cell shifts its content, which is a binary digit, to the next cell, with cell 78 shifting its contents around to cell 82. Initially, a PN code is entered into the generator 70 by setting each of the memory cells to a particular digit. The output of the generator can be taken from any of the memory cells therein such as from output line 84 from cell 78. At each clock pulse, the digit on output line 84 is equal to the next digit of the PN code. It can be seen that the code repeats itself after a predetermined number of clock pulses, and the length of the code is determined by the number of memory cells.

The counter 74 is a binary counter which registers a count for every clock pulse received from the clock 76. Such counters are well known in the art. The count is registered in the counting cells 86 of the counter.

The reset circuit 72 is a logic network, illustrated in a simplified form by the AND gate 88 thereof. The AND gate 88 has inputs connected to the output of selected memory cells of the generator 70. The code registered in the PN generator 70 will include a certain pattern which is contained in only one portion of the code and which is not repeated. For example, the number 101101 may occur in only one place of the PN code. The AND gate 88 has inputs connected directly to four memory cells and through inverter gates 90 to two other memory cells so that when the pattern 101101 begins to appear at the output line 84, the AND gate 88 delivers a pulse to the counter 74. The pulse from the AND gate 88 resets all memory elements in the counter so that the count begins from zero again. In this way, every position of the PN code in the generator 70 corresponds to a unique count on the counter 74, and synchronization of PN generator 70 and counter 74 begins after the first pulse from the AND gate of the reset circuit 72.

The clock 76 typically has an output 80 derived from the carrier wave by utilizing a clock oscillator 92 which generates the carrier wave, and dividing its output with a divider 94 to obtain the lower frequency pulses required for advancing the PN generator 70 and counter 74. The circuit of FIGURE 3 provides an output from the counter 74 which is taken over many output lines (not shown) leading to the adder circuit, such as adder 62 of FIGURE 2.

While a particular embodiment of the invention has been illustrated and described, it should be understood that many modifications and variations may be resorted to by those skilled in the art, and the scope of the invention is limited only by a just interpretation of the following claims.

I claim:
1. A ranging system comprising:
   generator means for generating a ranging code;
   transmitting means responsive to the outputs of said generating means for transmitting radiation containing said ranging code;
   receiving means for receiving radiation containing said ranging code delayed by a time interval;
   ranging code detecting means coupled to said receiving means for detecting said delayed ranging code;
   first counter means for registering counts;
   first coupling means coupled to said generator means and said first counter means for advancing the count in said first counter means as the output of said generator means advances through said ranging code;
   second counter means for registering a second count;
   second coupling means coupled to said ranging code detecting means and said second counter means for establishing the count in said second counter means in accordance with the phase of the delayed ranging code detected by said detecting means; and
   counter comparor means coupled to said first and second counting means for providing an indication of the difference in counts therebetween.

2. A ranging system as defined in claim 1 wherein:
   said first coupling means comprises clock means coupled to said generator means and said first counter means for advancing the ranging code in said generator means and the count in said first counter means in unison.

3. A ranging system as defined in claim 1 wherein:
   said first coupling means comprises a reset means responsive to the phase of the ranging code output from said generator means, for resetting said first counter means to a predetermined count at a predetermined phase output of said ranging code from said generator means.

4. In a ranging system for determining the distance to an object, which includes a pseudonoise generator for generating a ranging code for transmission by a transmitter and a receiving system for generating a pseudorandom code identical to the transmitted code but phase delayed therefrom in accordance with the distance to said object, the improvement comprising:
   first counter means responsive to the phase of the ranging code delivered to said transmitter, for generating a count unique to each phase of said code delivered to said transmitter;
   second counter means responsive to the phase of said code generated by said receiving system, for generating a count indicating the phase of said code generated by said receiving system; and
   arithmetic means coupled to said first and second counter means for generating signals responsive to the difference in the counts of said first and second counter means.

5. The improvement in a ranging system as defined in claim 4 wherein:
   said ranging code generated by said pseudonoise generator has a predetermined pulse rate equal to the miximum rate at which said code changes; and
   each of said counter means includes means for advancing the count thereof at said pulse rate of said ranging code generator.

6. The improvement in a ranging system as defined in claim 4 wherein:
   said first counter means comprises clock means for delivering pulses to said pseudonoise generator to advance the ranging code delivered therefrom to said transmitter and to advance the count in said first counter means, and reset means responsive to the phase of the ranging code from said pheudonoise generator for setting the count in said first counter means to a predetermined value upon the detection of a predetermined phase of the ranging code in said generator.

7. A ranging system comprising:
   a pseudonoise generator for generating binary signals in accordance with a predetermined code which repeats after a predetermined interval;
   a first counter for registering counts;
   clock means for generating pulses, connected to said generator and said counter for advancing the output code of said generator and the count in said first counter simultaneously;
   receiver code means for providing a pseudorandom code identical in form to the code of said generator;
   a second counter;
   advancing means coupled to said receiver code means and said second counter for advancing the count in said counter in unison with the gross phase changes of the code from said receiver code means; and
   arithmetic means coupled to said first and second counters for providing an indication of the difference in counts in said counters.

8. A ranging system as defined in claim 7 including:
means coupled to said clock means and said advancing means for indicating the phase relationship of outputs from them.

9. A ranging system comprising:
generator means for generating a ranging code, including a circulating register that has a plurality of binary memory cells connected in tandem;
transmitting means responsive to the outputs of said generating means for transmitting radiation containing said ranging code;
receiving means for receiving radiation containing said ranging code delayed by a time interval;
ranging code detecting means coupled to said receiving means for detecting said delayed ranging code;
first counter means for registering counts, said first counter means including a binary counter;
first coupling means coupled to said generator means and said first counter means for advancing the count in said first counter means as the output of said generator means advances through said ranging code, said first coupling means including clock means for generating pulses which simultaneously advance the count in said first counter means and shift the digit representation in each of said memory cells of said register to the next succeeding memory cells;
second counter means for registering a second count;
second coupling means coupled to said ranging code detecting means and said second counter means for establishing the count in said second counter means in accordance with the phase of the delayed ranging code detected by said detecting means; and
counter comparor means coupled to said first and second counter means for providing an indication of the difference in counts therebetween.

10. A ranging system as defined in claim 9 wherein:
said first coupling means includes logic circuit means responsive to the output of selected memory cells of said register for resetting said binary counter to a predetermined count upon the detection of predetermined binary states of selected memory cells.

11. In a ranging system for determining the distance to an object, which includes a pseudonoise generator for generating a ranging code that includes a train of characters, each having at least a predetermined duration, for transmission by a transmitter and a receiving system for generating a pseudorandom code identical to the transmitted code but phase delayed therefrom in accordance with the distance to said object, the improvement comprising:

first counter means responsive to the phase of the ranging code delivered to said transmitter, for generating a count unique to each phase of said code delivered to said transmitter;
second counter means responsive to the phase of said code generated by said receiving system, for generating a count indicating the phase of said code generated by said receiving system; and
arithmetic means coupled to said first and second counter means for generating signals responsive to the difference in the counts of said first and second counter means; and wherein:
said receiving system comprises phase shifted PN generator means for generating a phase delayed code identical in form with said transmitted code, receiving means for receiving said ranging code returned by said object, and means for maintaining the phase delayed code generated by said phase shifted PN generator means in a predetermined phase relationship to the phase of the code received by said receiving means with an accuracy of a fraction of said predetermined duration of characters; and further including:
clock means coupled to said pseudonoise generator for advancing the phase of the code output therefrom in steps;
pulse means coupled to said phase shifted PN generator means for advancing the phase of the code output therefrom in steps; and
means responsive to the outputs of said clock means and said pulse means for indicating times of occurrence of a predetermined phase relationship between said outputs of said clock means and said pulse means.

References Cited
UNITED STATES PATENTS

| | | | |
|---|---|---|---|
| 3,163,862 | 12/1964 | Jenny | 343—14 X |
| 3,199,104 | 8/1965 | Miller | 343—12 |
| 3,229,203 | 1/1966 | Minohara | 343—13 X |
| 3,246,324 | 4/1966 | Price | 343—7.3 |
| 3,277,473 | 10/1966 | Calhoon, et al. | 343—13 |
| 3,343,157 | 9/1967 | Carre et al. | 343—13 X |
| 3,354,455 | 11/1967 | Briggs et al. | 343—7.3 |

RODNEY D. BENNETT, JR., *Primary Examiner.*

J. P. MORRIS, *Assistant Examiner.*

U.S. Cl. X.R.
343—17.2, 17.5